(12) United States Patent
Lin (10) Patent No.: US 7,492,576 B2
(45) Date of Patent: Feb. 17, 2009

(54) COMPUTER WITH A CASE MEMBER MOUNTING STRUCTURE

(75) Inventor: Chien-Chen Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 222 days.

(21) Appl. No.: 11/652,627

(22) Filed: Jan. 12, 2007

(65) Prior Publication Data
US 2007/0206348 A1 Sep. 6, 2007

(30) Foreign Application Priority Data
Mar. 3, 2006 (TW) .............................. 95107290 A (51) Int. Cl.
*G06F 1/16* (2006.01)
(52) U.S. Cl. .................................... 361/679; 312/223.2
(58) Field of Classification Search ................ 361/683, 361/679; 312/223.1, 223.2
See application file for complete search history.

(56) References Cited

U.S. PATENT DOCUMENTS

| | | | | |
|---|---|---|---|---|
| 6,385,036 | B1 * | 5/2002 | Chien | 361/683 |
| 7,095,609 | B2 * | 8/2006 | Erickson et al. | 361/683 |
| 2005/0285486 | A1 * | 12/2005 | Xu | 312/223.2 |

* cited by examiner

*Primary Examiner*—Lisa Lea-Edmonds
(74) *Attorney, Agent, or Firm*—Bacon & Thomas, PLLC (57) ABSTRACT

A computer with a case member mounting structure includes a first case member, a second case member, a slide, a spring member, and an operation lever. The first case member has at least one opening. The second case member includes at least one first retaining member. The slide is movably supported on the first case member. The push portion of the first retaining member is inserted into the opening for pushing the slide to move in a first direction to a first position so that the hooked portion of the first retaining member is engaged with the opening. The operation lever is pivoted to the first case member. When the operation lever is rotated to a second position, the operation lever pushes the slide to move in the first direction, so as to disengage the hooked portion from the opening.

10 Claims, 7 Drawing Sheets

COMPUTER WITH A CASE MEMBER MOUNTING STRUCTURE

BACKGROUND OF THE INVENTION

1. Field of the Invention

The present invention relates to a case member mounting structure and more particularly to a computer with a case member mounting structure.

2. Description of Related Art

The mainframe of a commercial desktop computer generally comprises a case, a motherboard, a CPU, memory means, a hard disk drive, an optical disc device, a power adapter, and etc. The case includes a case body and a top cover. The case body houses the CPU, the memory means, the hard disk drive, the optical disc device, the power adapter, and etc. The top cover is covered on the case body.

According to conventional designs, the case body and top cover of the case of a computer are fastened together with screws, or screws and nuts. When the user or maintenance engineer wishes to add an additional component part, for example, a hard disk to expand storage capacity or to repair the motherboard, a screwdriver shall be used to unfasten the screws so that the top cover can be opened from the case body. After installation of the new component part or after the repair work is done, the user or repair engineer must fasten up the screws to affix the top cover to the case body again. This mounting/dismounting procedure is complicated and wastes a lot of time. Further, the threads of the screws wear quickly with use. When the threads of the screws are damaged, is becomes more difficult to detach the top cover from the case body, Therefore, this computer case mounting design is not satisfactory in function.

Further, there are computer case designs in which the case body and the top cover use hooks and hook holes for connection, and a button for disconnection control. However, the hooks and the hook holes may be fastened too tight. In this case, the user must press the button and pull the case body and the top cover apart with much effort. If the hooks are not tightly hooked in the associating hook holes, the top cover may be forced away from the case body accidentally.

Therefore, it is desirable to provide a case member mounting structure that eliminates the aforesaid drawbacks.

SUMMARY OF THE INVENTION

The computer with a case member mounting structure of the present invention comprises a first case member, a second case member, a slide, a spring member, and an operation lever. The first case member has at least one opening. The second case member includes at least one first retaining member which has a hooked portion and a push portion. The slide is movably supported on the first case member. The slide has at least one second retaining member. The push portion of the first retaining member is inserted into the opening for pushing the slide to move in a first direction to a first position so that the hooked portion of the first retaining member is engaged with the opening. The operation lever is pivoted to the first case member. When the operation lever is rotated to a second position, the operation lever pushes the slide to move in the first direction, so as to disengage the hooked portion from the opening. The spring member is connected between the first case member and the slide and imparts a pull force to the slide in a second direction.

By means of the aforementioned arrangement, the first case member and the second case member are locked without screws. Further, by means of turning the operation lever with one single hand or pushing the first case member inwards, the first case member and the second case member are unlocked or locked. Because the invention employs the lever principle, it requires less effort to unlock the first case member and the second case member.

Further, the slide has a second contact portion, and the operation lever has a first contact portion kept in contact with the second contact portion of the slide and disposed between the second contact portion and the spring member.

The first contact portion of the operation lever stops the slide in a third position when the pull force is pulling the slide in the second direction. The operation lever is closely attached to the second case member when the slide is in the third position.

Further, when the operation lever is in the second position, the first contact portion of the operation lever is stopped against the second contact portion of the slide and forced to push the slide in a first direction. The first contact portion of the operation lever can be a stop rod, and the second contact portion of the slide can be a stop plate. The operation lever further has a third contact portion. The second case member has a fourth contact portion movable with the third contact portion of the operation lever. The fourth contact portion of the second case member can be a handlebar, and the third contact portion of the operation lever can be a smoothly arched plate adapted to move the fourth contact portion of the second case member when the operation lever is turned relative to the first case member. The first case member further has at least one sliding groove adapted to receive and guide movement of the slide. The at least one second retaining member of the slide each is a narrow elongated slot, and the at least one opening of the first case member each is a narrow elongated slot.

DETAILED DESCRIPTION OF THE PREFERRED EMBODIMENT

Figure 1:
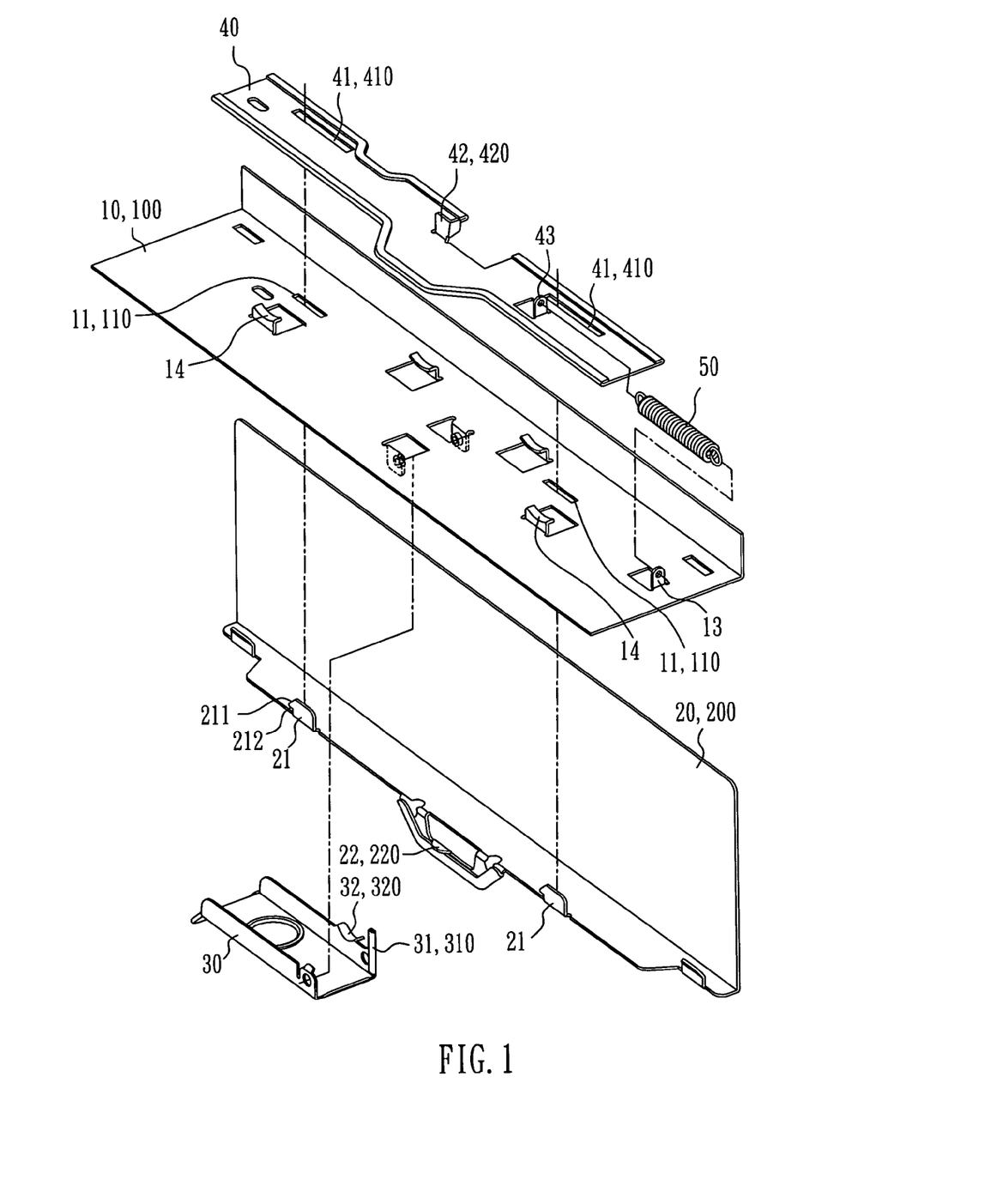
FIG. 1 is an exploded view of a case member mounting structure in accordance with the preferred embodiment of the present invention.
Figure 2:
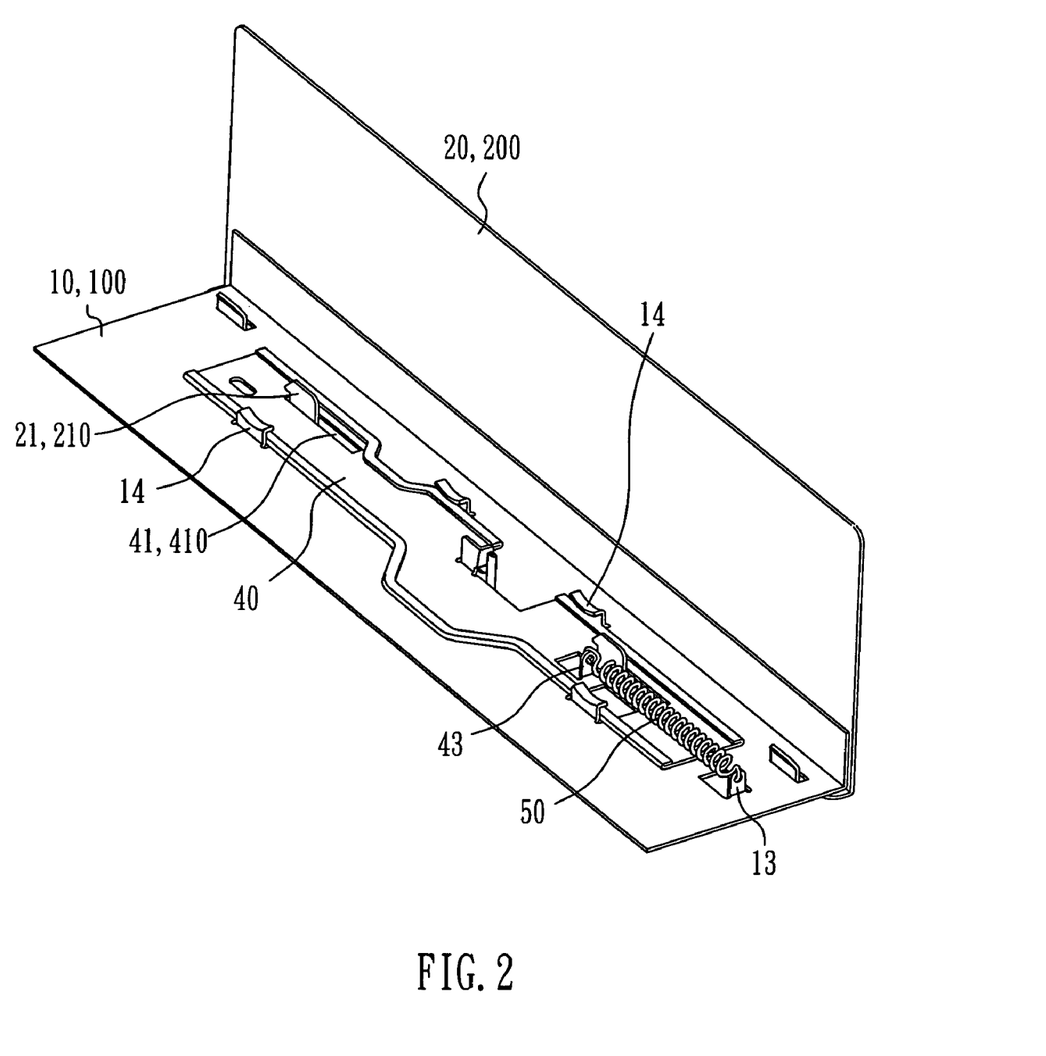
FIG. 2 is a perspective assembly view of the case member mounting structure in accordance with the preferred embodiment of the present invention.

Referring to FIGS. 1 and 2, a case member mounting structure in accordance with the preferred embodiment of the present invention is shown. The case member mounting structure includes a first case member 10, a second case member 20, a slide 40, an operation lever 30, and a spring member 50.

As shown in FIG. 1, the first case member 10 has two openings 11, four sliding grooves 14, and a first locating portion 13, wherein the sliding grooves 14 are alternatively arranged in two lines on the first case member 10. The first locating portion 13 is disposed near one end of the first case member 10 for the hooking of one end of the spring member 50.

Further, the second case member 20 has first retaining members 21 corresponding to the openings 11 of the first case member 10, and a fourth contact portion 22. Each first retaining member 21 has a push portion 211 insertable into one opening 11, and a hook portion 212 protruding from the push portion 211 for hooking on the periphery of the associating opening 11.

Further, as shown in FIG. 1, the slide 40 is mounted on the first case member 10 corresponding to the four sliding grooves 14. The sliding grooves 14 are adapted to movement of the slide 40 relative to the first case member 10 stably in a predetermined path. The slide 40 includes second retaining members 41, a second locating portion 43, and a second contact portion 42. The second retaining members 41 are set corresponding to the openings 11 of the first case member 10. The second locating portion 43 is disposed near a middle part of the slide 40 for the hooking of the other end of the spring member 50.

Referring to FIG. 1 again, the operation lever 30 is pivoted to the first case member 10, having a first contact portion 31 and a third contact portion 32. The first contact portion 31 is disposed at one end of the operation lever 30 and is located between the spring member 50 and the contact portion 42 of the slide 40. The third contact portion 32 is formed on the operation lever 30 corresponding to the fourth contact portion 22 of the second case member 20. Further, the spring member 50 has two ends respectively fastened to the first locating portion 13 of the first case member 10 and the second locating portion 43 of the slide 40.

Figure 3:
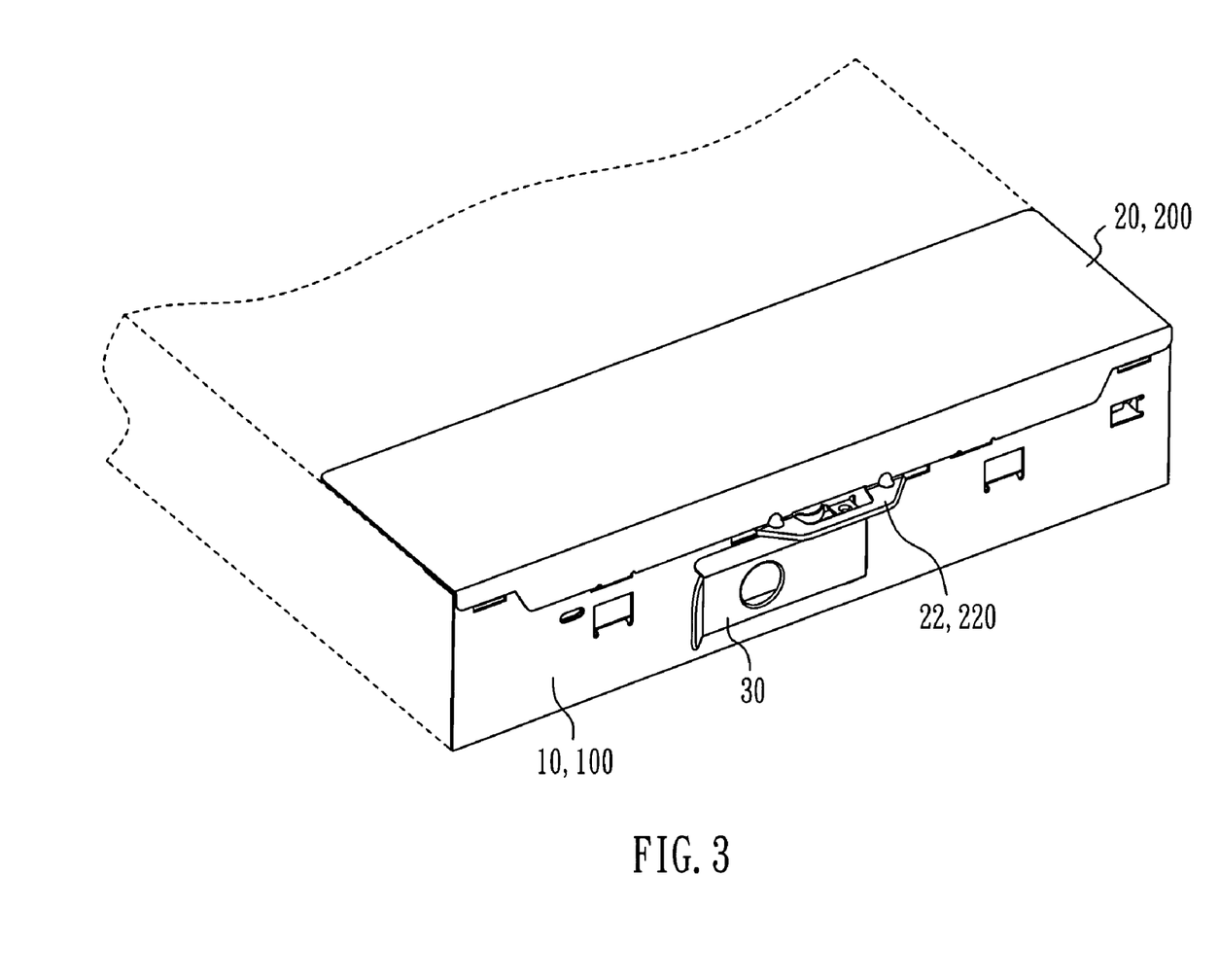
FIG. 3 illustrates the case member mounting structure used in a computer mainframe according to the preferred embodiment of the present invention.

Referring to FIG. 3 and FIG. 2 again, the first case member 10 provided by this embodiment is the case body 100 of a computer mainframe. The second case member 20 is the top cover 200 of a computer mainframe. As shown in FIG. 1, in this embodiment, the first contact portion 31 of the operation lever 30 is a stop rod 310; the second contact portion 42 of the slide 40 is a stop plate 420; the third contact portion 32 of the operation lever 30 is an arched plate 320; the fourth contact portion 22 of the second case member 20 is a handlebar 220; the openings 11 of the first case member 10 are narrow elongated slots 110; the second retaining members 41 of the slide 40 are narrow elongated slots 410.

Figure 4:
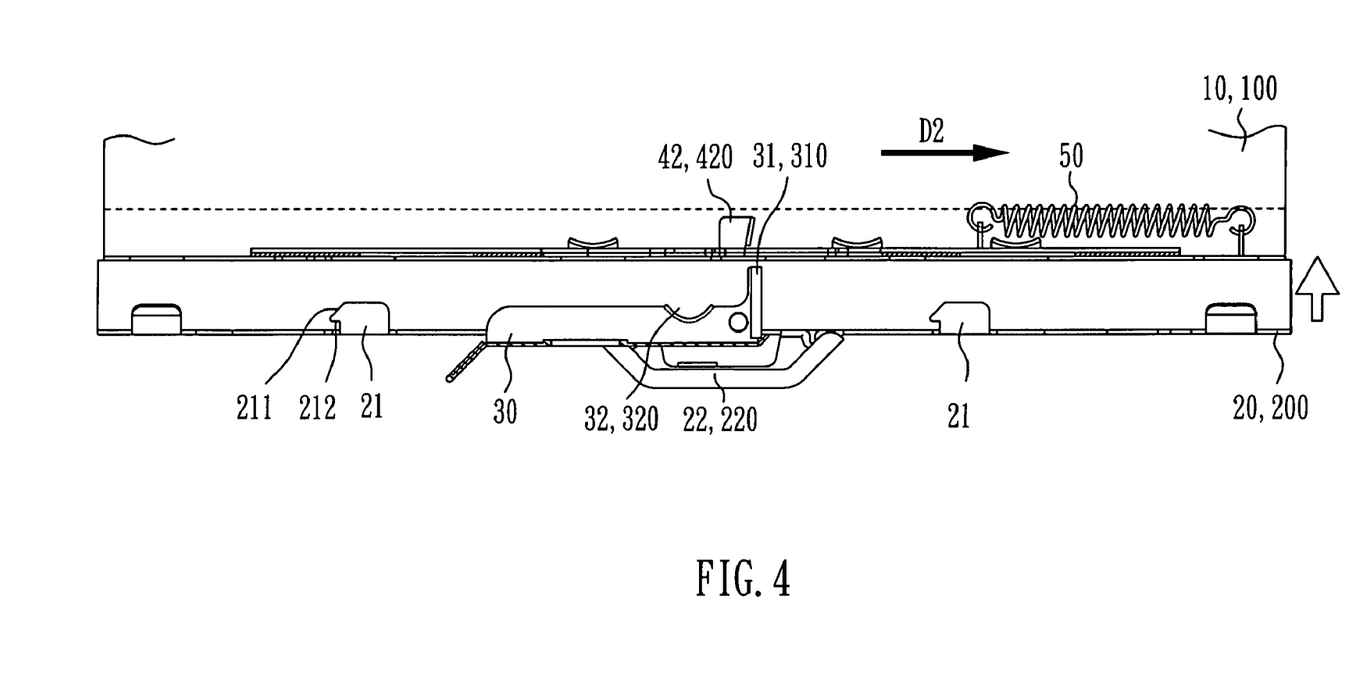
FIG. 4 is a schematic top view of the present invention, showing the status of the present invention before engagement between the first case member and the second case member according to the preferred embodiment of the present invention.

The operation of the preferred embodiment of the present invention is outlined hereinafter with reference to FIGS. 4~7 and FIG. 1 again. Referring to FIGS. 1 and 4, before engagement between the hooked portions 212 of the first retaining members 21 of the second case member 20 with the associating openings 11 of the first case member 10, the spring member 50 imparts a pull force to the slide 40 in a second direction D2 toward the spring member 50.

Figure 5:
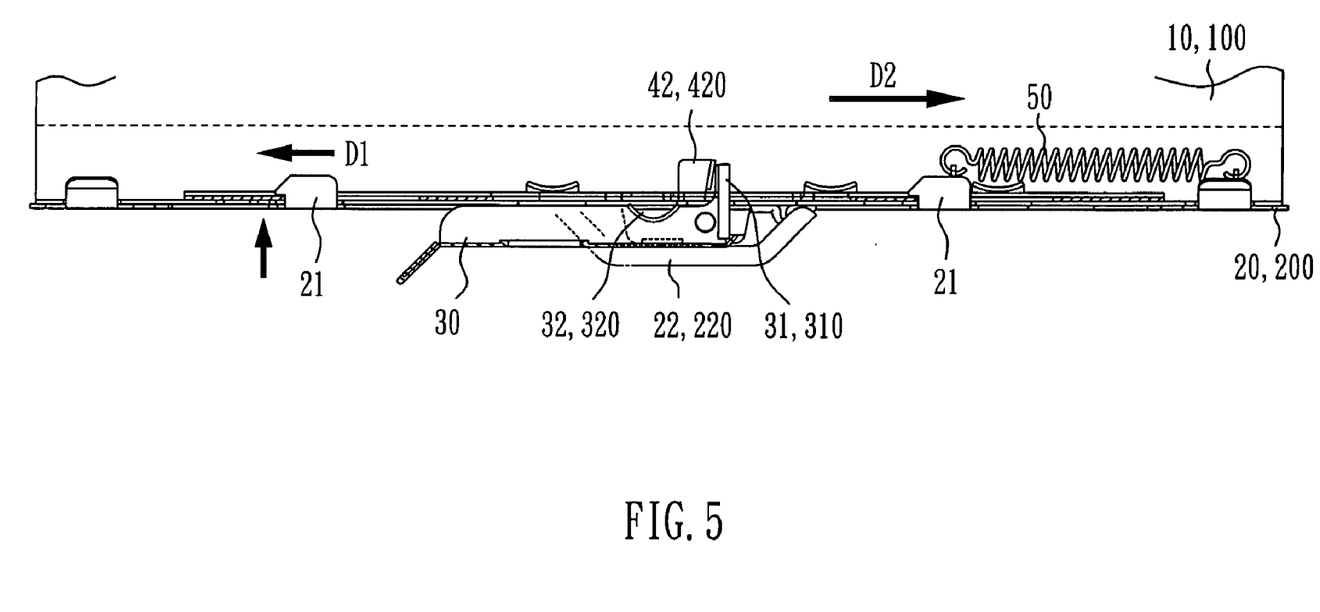
FIG. 5 is a schematic top view of the present invention, showing the first case member and the second case member engaged together according to the preferred embodiment of the present invention.

Referring to FIGS. 1 and 5, when the push portion 211 of each first retaining member 21 of the second case member 20 is respectively inserted into the openings 11 of the first case member 10, the push portion 211 of each first retaining member 21 of the second case member 20 is respectively forced against the second retaining members 41 of the slide 40, causing the slide 40 to move in a first direction D1 apart from the spring member 50. When the slide 40 reached a first position, the hooked portion 212 of each first retaining member 21 of the second case member 20 is respectively forced into engagement with the periphery of the associating opening 11 of the first case member 10, and therefore the first case member 10 and the second case member 20 are secured together. At this time, the spring member 50 imparts a pull force to the slide 40 to pull the slide 40 in the second direction D2, and the first contact portion 31 of the operation lever 30 is stopped against the second contact portion 42 of the slide 40 to stop the slide 40 from moving in the second direction D2 and to hold the slide 40 in the third position (see FIG. 5), i.e., the spring member 50 is stretched and the operation lever 30 is closely attached to the second case member 20 at this time.

Figure 6:
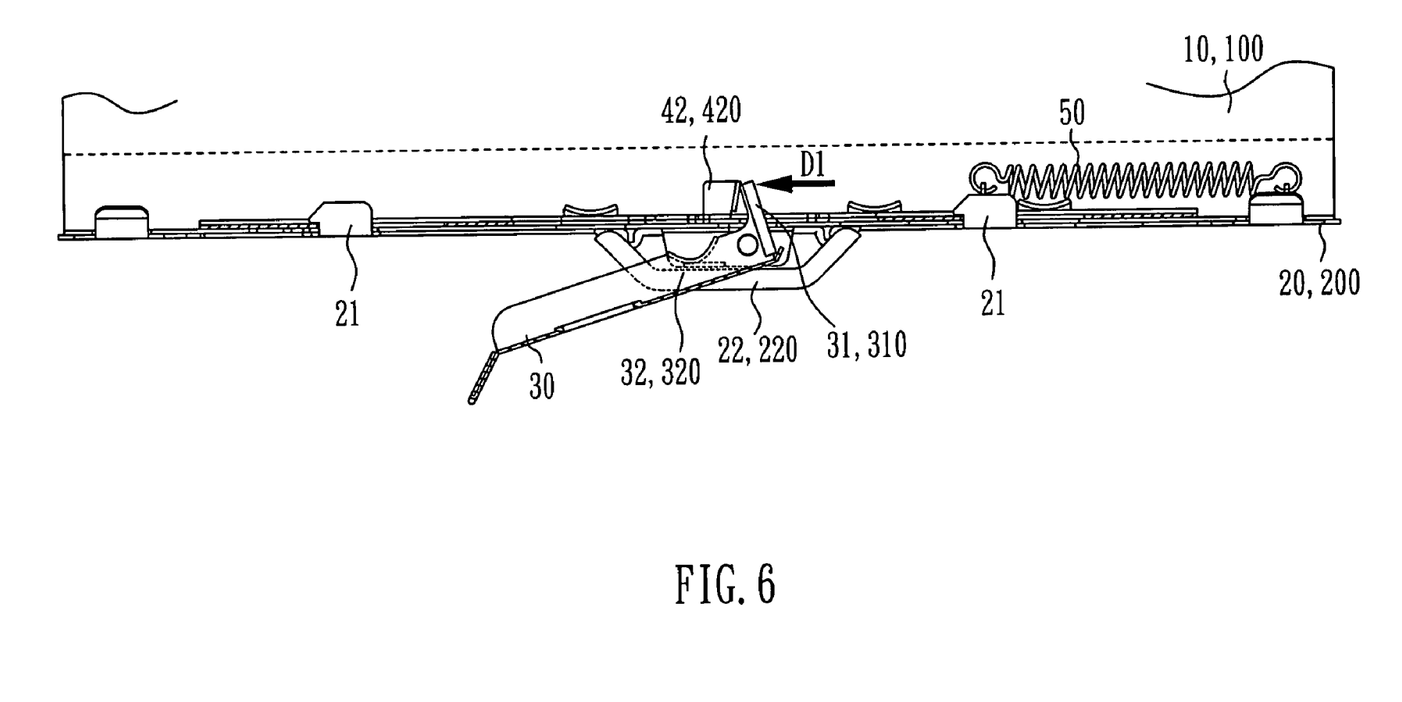
FIG. 6 is a schematic top view showing the status of the present invention when the operation lever is turned to an angle corresponding to a second position according to the preferred embodiment of the present invention.

Referring to FIGS. 1 and 6, when the operation lever 30 is turned to an angle corresponding to a second position (see FIG. 6), the first contact portion 31 of the operation lever 30 is forced against the second contact portion 42 of the slide 40 to move the slide 40 in the first direction D1 to the first position, i.e., to disengage the hooked portions 212 of the first retaining members 21 of the second case member 20 from the openings 11 of the first case member 10. At this time, the third contact portion 32 of the operation lever 30 does not touch the fourth contact portion 22 of the second case member 20, and the spring member 50 is stretched further (i.e., the length of the spring member 50 at this time is longer than the length in FIG. 5 where the first case member 10 and the second case member 20 are locked).

Figure 7:
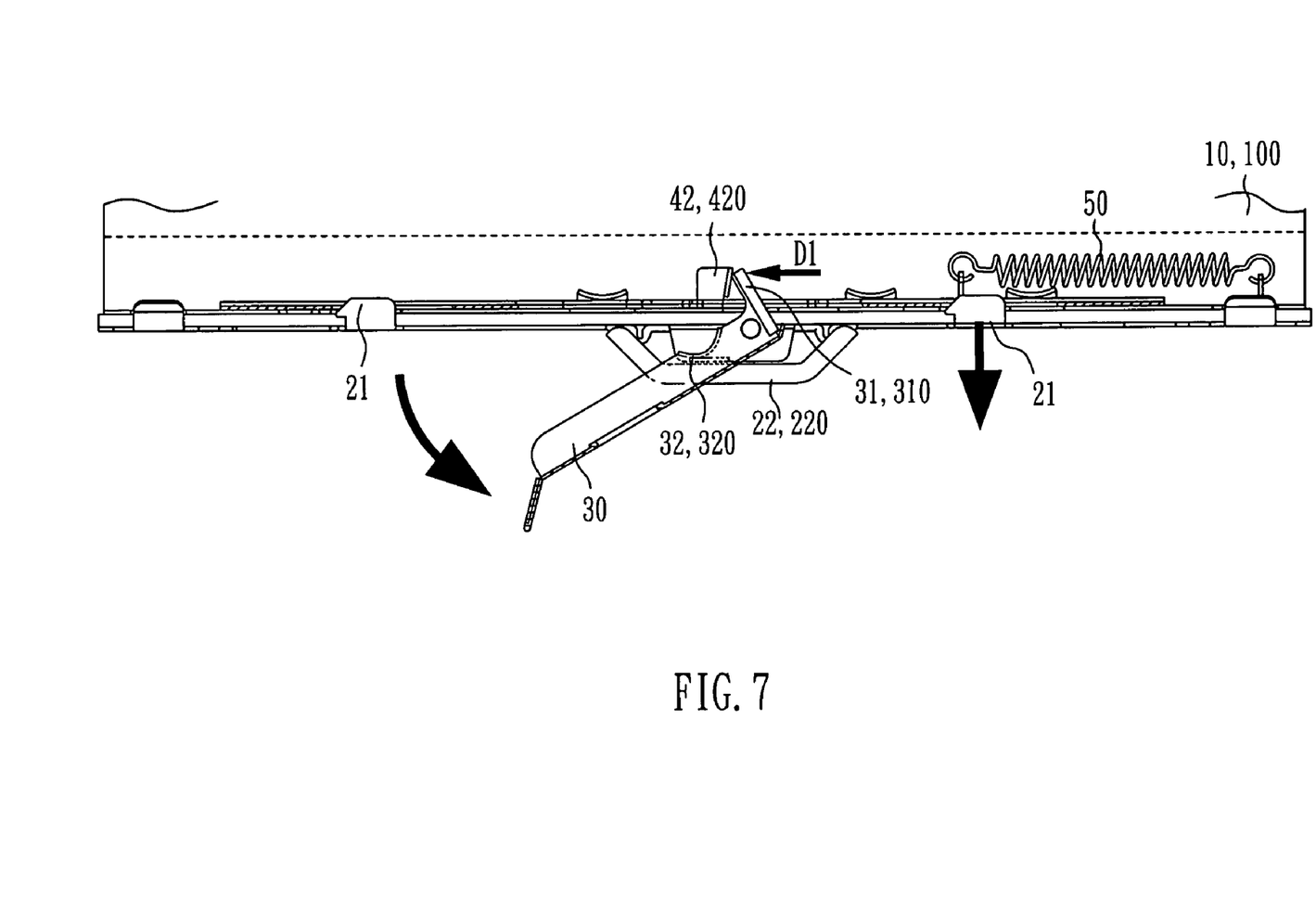
FIG. 7 is a schematic top view of the present invention, showing the first case member unlocked from the first case member according to the preferred embodiment of the present invention.

Referring to FIGS. 1 and 7, when the operation lever 30 is turned to an angle greater than that at the second position, the third contact portion 32 of the operation lever 30 is disposed in contact with the fourth contact portion 22 of the second case member 20, and the hooked portions 212 of the first retaining members 21 of the second case member 20 are kept apart from the openings 11 of the first case member 10. Therefore, by means of the third contact portion 32 of the operation lever 30 to push the fourth contact portion 22 of the second case member 20, the second case member 20 is unlocked from the first case member 10.

Therefore, the first case member 10 and the second case member 20 can be locked without screws. Further, simply by operating the operation lever 30 with one single hand, the user can conveniently unlock the first case member 10 and the second case member 20. By means of the lever principle, the user can operate the operation lever 30 to unlock the first case member 10 and the second case member 20 with less effort.

Although the present invention has been explained in relation to its preferred embodiment, it is to be understood that many other possible modifications and variations can be made without departing from the spirit and scope of the invention as hereinafter claimed.

What is claimed is:

1. A computer with a case member mounting structure comprising:

a first case member, having at least one opening;

a second case member, including at least one first retaining member having a hooked portion and a push portion;

a slide movably supported on the first case member, the slide having at least one second retaining member, the push portion of the first retaining member being inserted into the opening for pushing the slide to move in a first direction to a first position so that the hooked portion of the first retaining member is engaged with the opening;

an operation lever pivoted to the first case member, when the operation lever is rotated to a second position, the operation lever pushing the slide to move in the first direction, so as to disengage the hooked portion from the opening; and a spring member connected between the first case member and the slide and imparting a pull force to the slide in a second direction.

2. The computer with a case member mounting structure as claimed in claim 1, wherein the slide has a second contact portion, and the operation lever has a first contact portion kept in contact with the second contact portion of the slide and disposed between the second contact portion and the spring member.

3. The computer with a case member mounting structure as claimed in claim 2, wherein the first contact portion of the operation lever stops the slide in a third position when the slide is pulled by the pull force in the second direction.

4. The computer with a case member mounting structure as claimed in claim 3, wherein the operation lever is closely attached to the second case member when the slide is in the third position.

5. The computer with a case member mounting structure as claimed in claim 2, wherein when the operation lever is in the second position, the first contact portion of the operation lever is stopped against the second contact portion of the slide and forced to push the slide.

6. The computer with a case member mounting structure as claimed in claim 2, wherein the first contact portion of the operation lever is a stop rod, and the second contact portion of the slide is a stop plate.

7. The computer with a case member mounting structure as claimed in claim 1, wherein the operation lever further has a third contact portion, and the second case member has a fourth contact portion movable with the third contact portion of the operation lever.

8. The computer with a case member mounting structure as claimed in claim 7, wherein the fourth contact portion of the second case member is a handlebar, and the third contact portion of the operation lever is a smoothly arched plate adapted to move the fourth contact portion of the second case member when the operation lever is turned relative to the first case member.

9. The computer with a case member mounting structure as claimed in claim 1, wherein the first case member further has at least one sliding groove adapted to receive and guide movement of the slide.

10. The computer with a case member mounting structure as claimed in claim 1, wherein the at least one second retaining member of the slide each is a narrow elongated slot.

* * * * *